H. D. BLISS & W. H. NEUBECK.
HOG SINGEING APPARATUS.
APPLICATION FILED SEPT. 24, 1918.
1,291,738.
Patented Jan. 21, 1919.
5 SHEETS—SHEET 3.
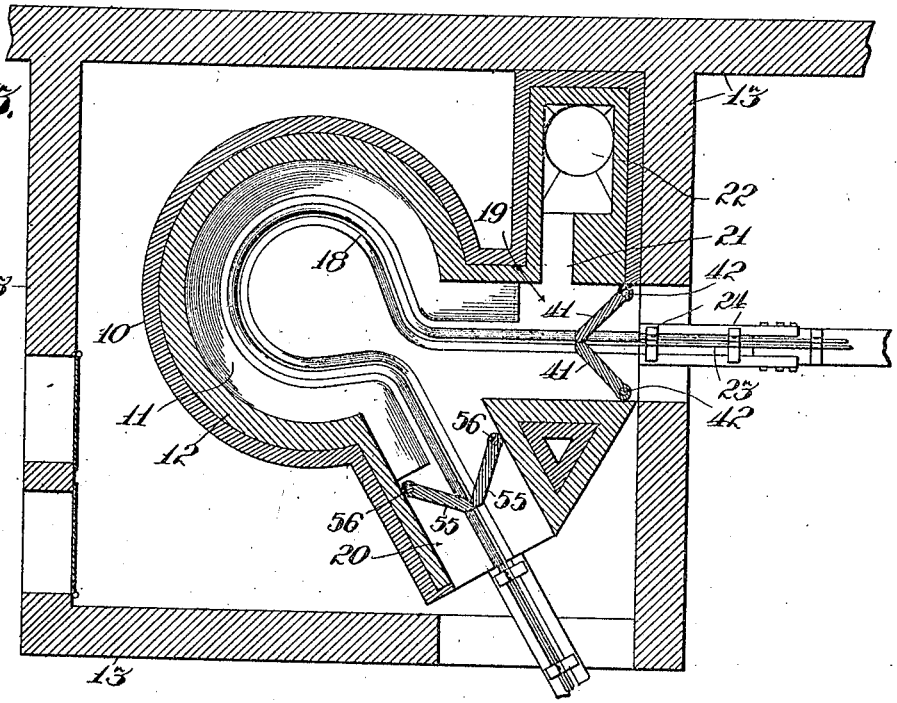
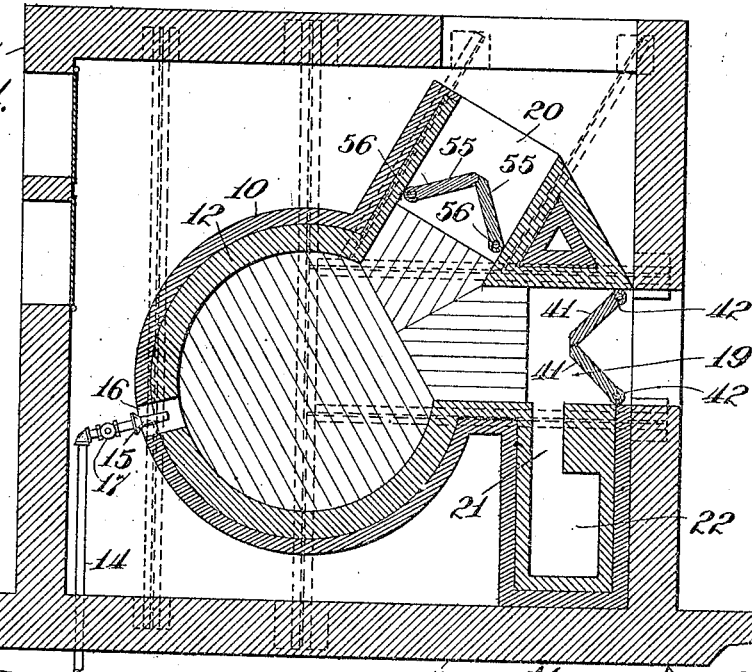

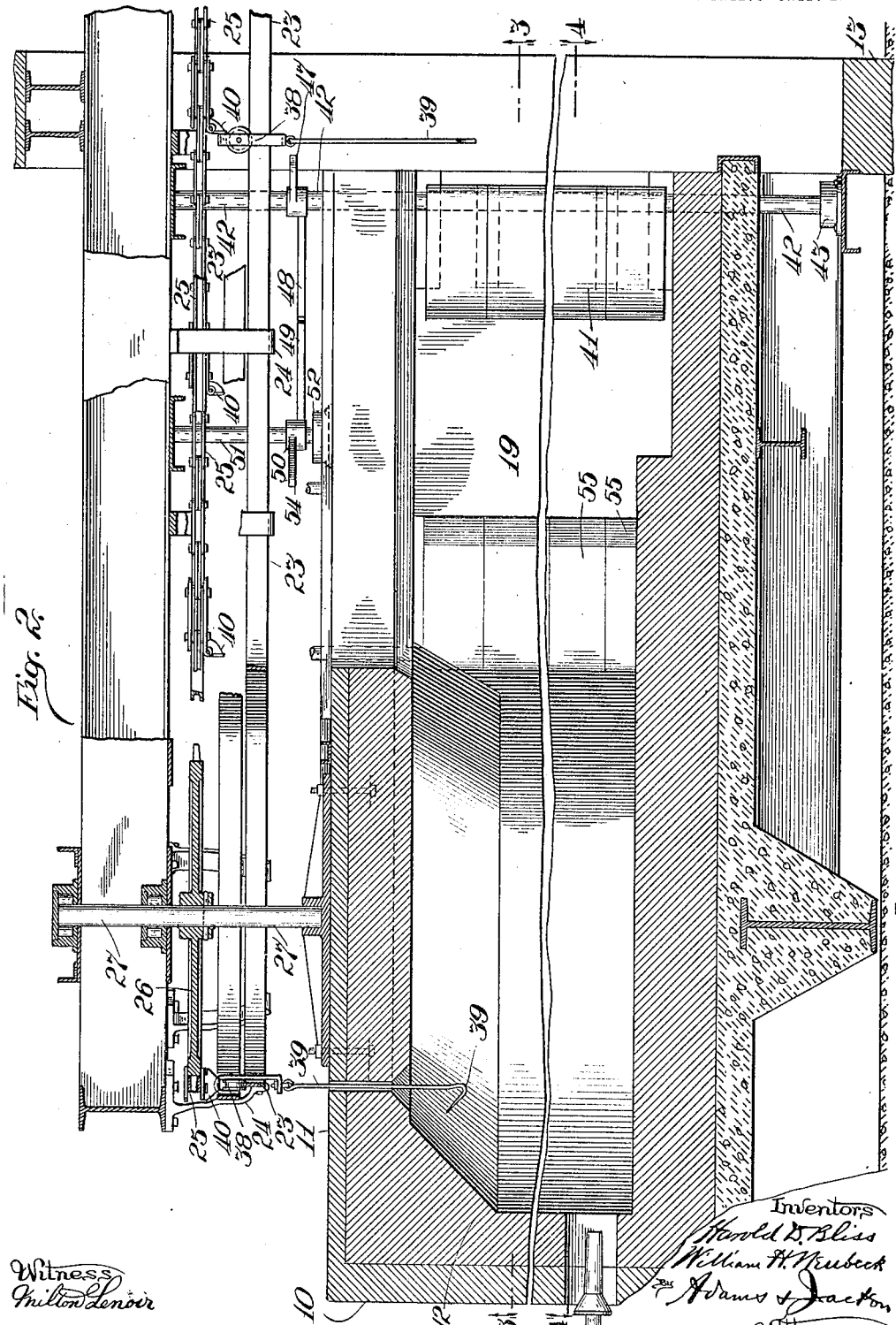

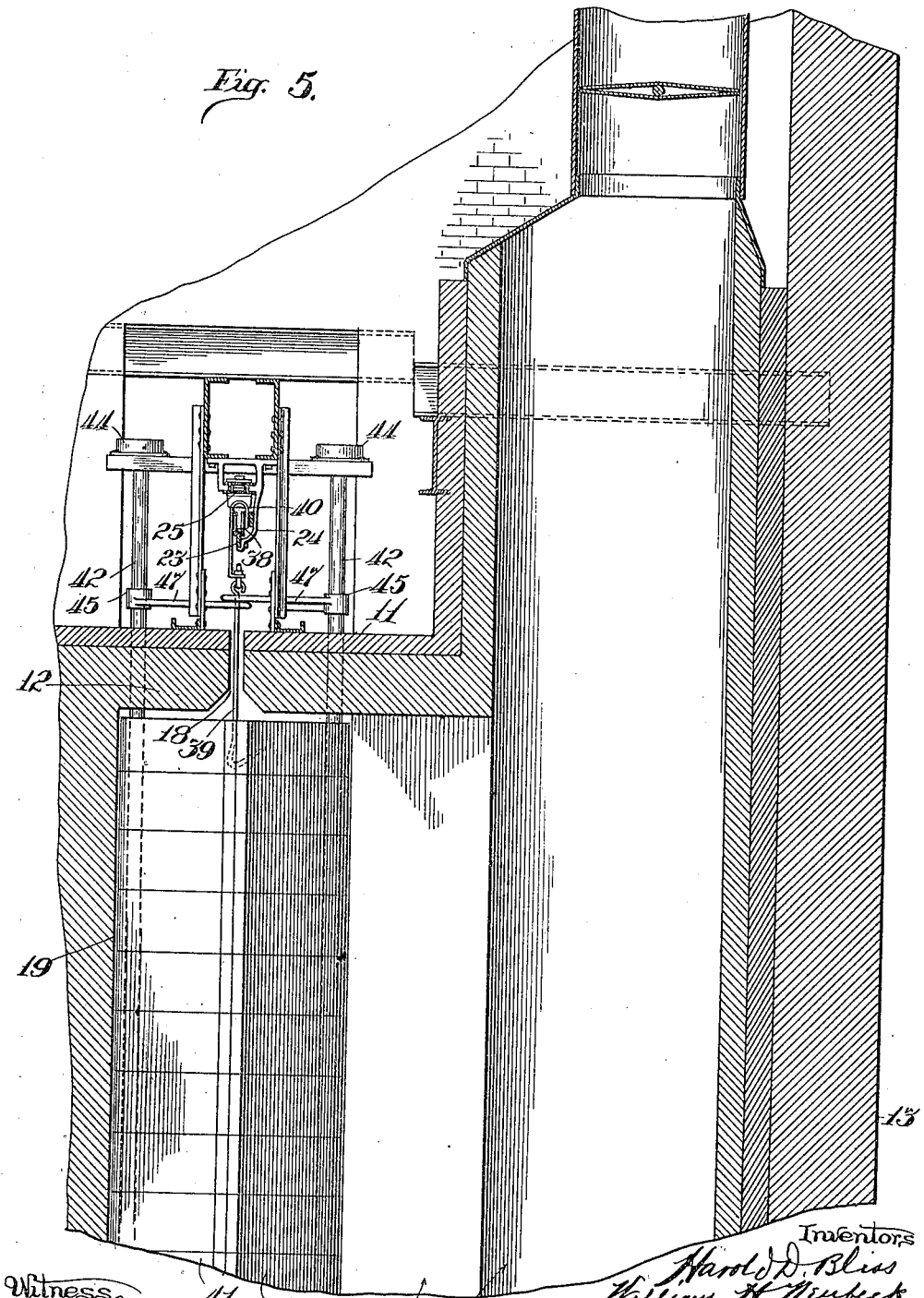

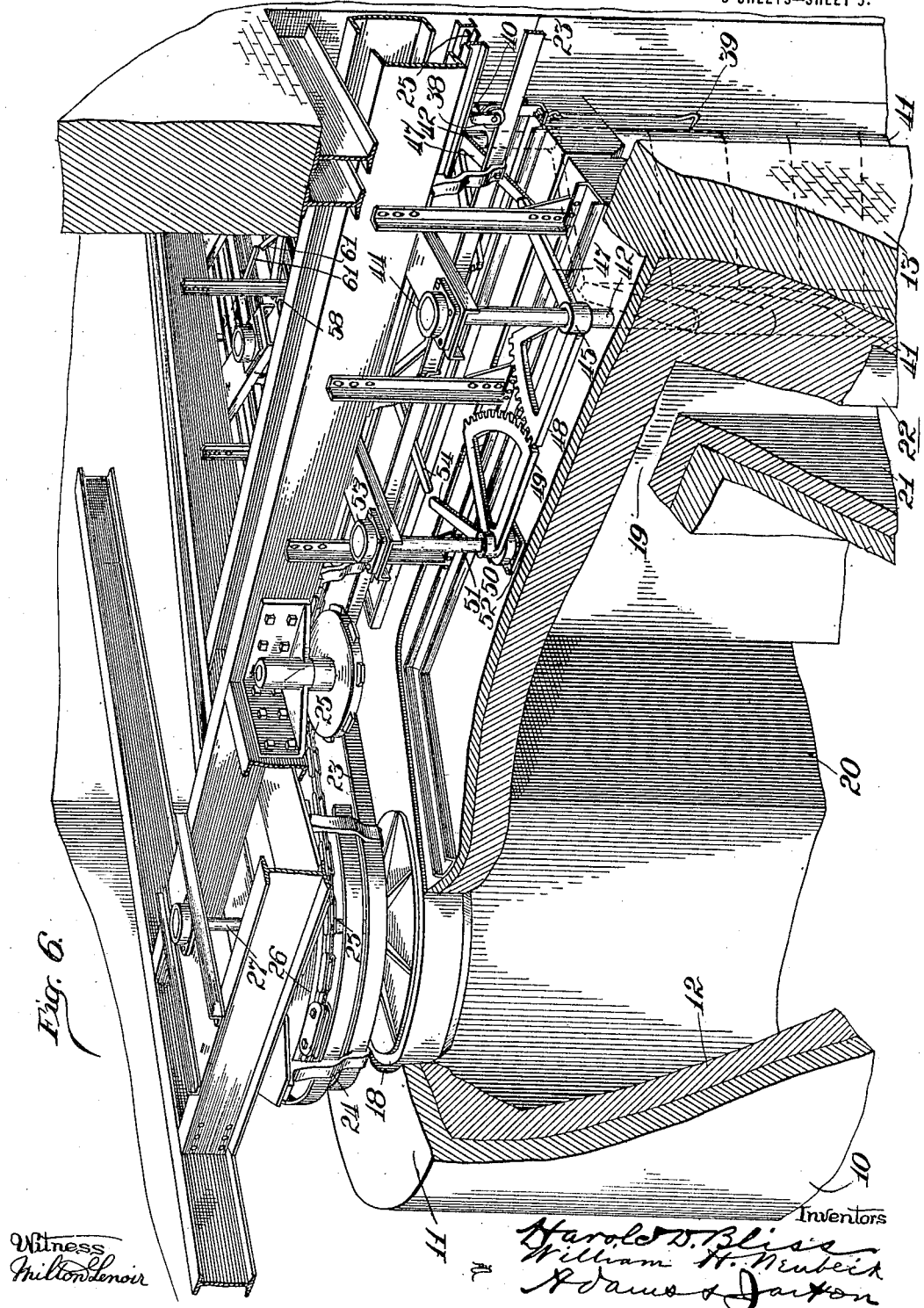

UNITED STATES PATENT OFFICE.

HAROLD D. BLISS AND WILLIAM H. NEUBECK, OF CHICAGO, ILLINOIS, ASSIGNORS TO MORRIS & COMPANY, OF CHICAGO, ILLINOIS, A CORPORATION OF MAINE.

HOG-SINGEING APPARATUS.

1,291,738.

Specification of Letters Patent.

Patented Jan. 21, 1919.

Application filed September 24, 1918. Serial No. 255,473.

*To all whom it may concern:*

Be it known that we, HAROLD D. BLISS and WILLIAM H. NEUBECK, citizens of the United States, and residents of Chicago, in the county of Cook and State of Illinois, have invented certain new and useful Improvements in Hog-Singeing Apparatus, of which the following is a specification, reference being had to the accompanying drawings.

In some instances it is desirable after the usual cleaning and scraping operations have been performed in connection with the carcasses of hogs to subject them to the additional operation known as singeing which is for the purpose of causing the formation thereover of a thin coating of grease that will to a large extent exclude air and thus tend to preserve the meat. Such singeing operation is done by the application to the carcass of intense heat quickly applied; unless quickly applied a considerable loss will be occasioned by the melting off of fat. As the singeing operation has been practised heretofore it has been customary to move the carcasses by means of an endless carrier vertically through a heating chamber, which method of handling them has been objectionable for several reasons, among which may be mentioned the inability to properly and evenly apply the heat during the whole of the time that a carcass is moving through such chamber, and also because of the inability to protect the endless carrier chains from the intense heat of the chamber, with the result that such chains will become warped to such an extent as to fail to function properly and thus serious damage and loss be occasioned by holding the carcasses in the chamber longer than required. In such constructions the endless carrier chains must be cooled continuously by running them through a body of water outside of the singeing chamber and the alternate heating and cooling that the chains are thus constantly subjected to materially shorten their period of usefulness. Furthermore, in such types of carrying apparatus the fact that the carcasses have to pass out at the top of the chamber results in a very great loss of heat from the chamber.

Our invention has for its leading objects to provide a heating chamber for the purpose named so constructed that the carcasses may be moved therethrough in such manner as to obtain during all of the time that they are in the chamber the full benefit of the heat in the chamber; to provide a construction that will sufficiently protect the endless carrier from the intense heat so that such carrier will not be distorted or become broken or be required to be constantly passed through a cooling medium; to provide improved means for automatically opening and closing the doors to the chamber to admit of the passage of carcasses to and from the chamber; and to provide such an arrangement of the stack through which the products of combustion pass from the chamber that the hot blast of spent gases in their passage to such stack will have to traverse the passage by which the carcasses enter the chamber and thus cause them by being subjected to such blast or draft to be dried to a large extent by the time they pass into the chamber proper, thus fitting them to at once receive the singeing effect of the heat as they pass into the chamber, and enabling them to be moved more rapidly through the chamber proper than if they entered it dripping wet from the washing operation. Such preliminary drying tends also to prolong the life of the chamber by keeping out therefrom the superheated steam and moisture that the entrance to the chamber of the dripping hogs would produce—such steam and moisture passing up the stack with the products of combustion. These various objects we accomplish by the construction and arrangement of devices and combinations of devices shown in the drawings and hereinafter described. That which we believe to be new will be pointed out in the claims.

In the drawings:

Fig. 2 is an enlarged vertical section taken at line 2—2 of Fig. 1, and showing in side elevation a portion of the door-operating means;

Figs. 3-4 are horizontal sections taken at lines 3—3 and 4—4, respectively, of Fig. 2, but on a reduced scale compared with Fig. 2,—the arrows indicating the direction of such views;

Fig. 5 is an enlarged vertical section taken at line 5—5 of Fig. 1; and

Fig. 6 is a perspective view with portions of the walls of the building in which the mechanism is housed broken away, some portions of the operating mechanism also being broken away.

Figure 1:
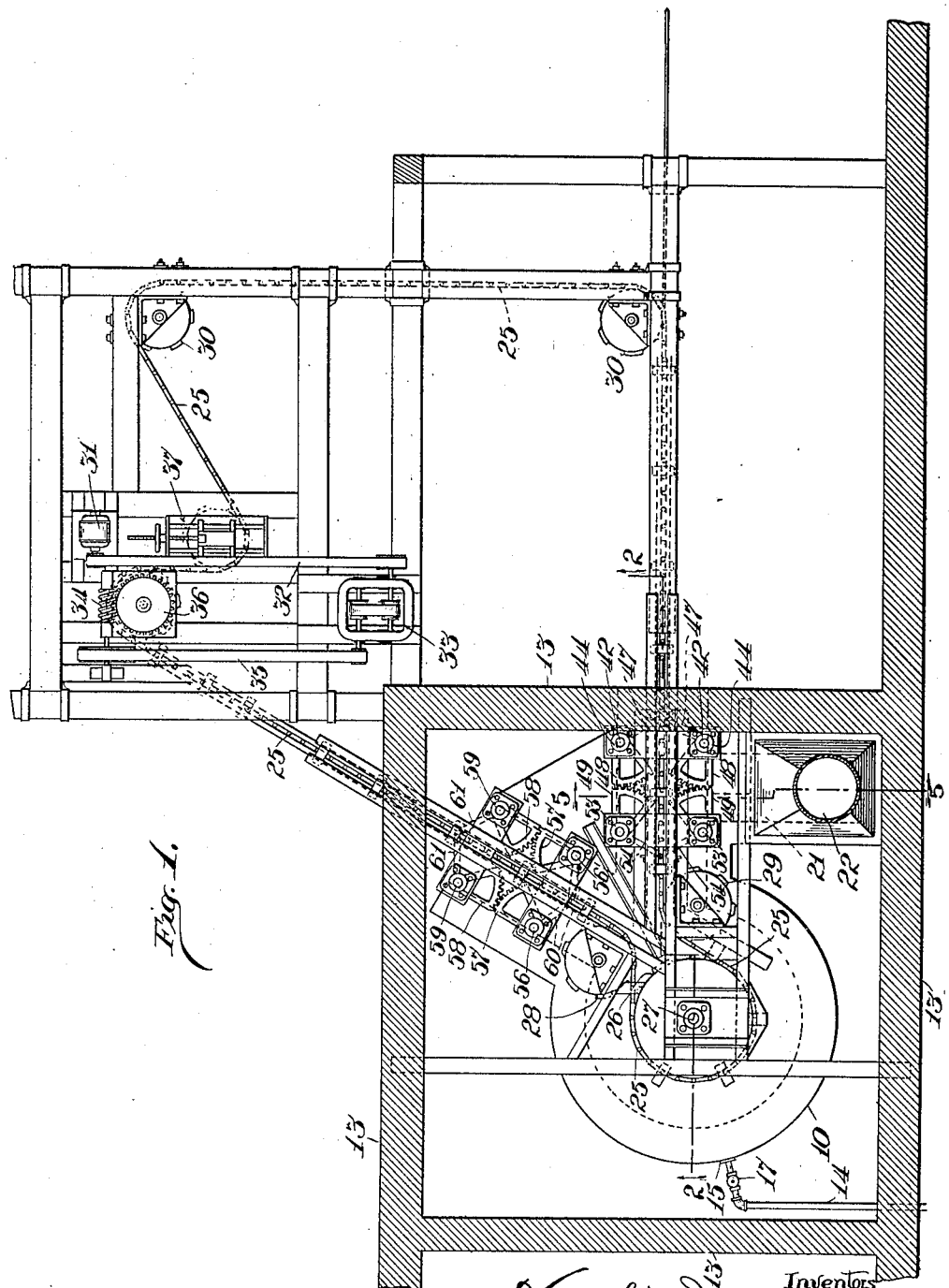
Figure 1 is a plan view of our improved apparatus, some of the walls of the building in which the apparatus is located being shown in horizontal section, as is also the stack through which the products of combustion are carried off.

Referring to the several figures of the drawings in which corresponding parts are indicated by the same reference characters— 10 indicates the side wall of a structure which in the construction shown is circular in form and which, with the wall 11 that covers its upper end, forms a heating chamber in which the singeing operation is performed, such chamber being lined with a suitable lining 12 of fire-brick or other material. As best shown in Figs. 3 and 4, this heating chamber is located in a room of a building the walls of which are indicated by 13, and through one of such walls extends a pipe 14 that carries a nozzle 15 projecting into an opening 16 through the wall and lining of the heating chamber. Through such pipe and nozzle oil or gas will be forced for fuel for heating the chamber, the supply thereof being controlled by a valve 17. We do not confine ourselves, however, to the use of a liquid or gaseous fuel as the chamber may be heated by any suitable means, but such fuels as mentioned are very effective in securing the desired high temperature of the chamber. In the upper wall 11 of the heating chamber is formed a slot 18 that is concentric, in the construction shown, for the greater portion of its length with the circular wall of the heating chamber. 19 and 20 indicate two passages leading from the heating chamber and serving, respectively, as an entrance to and an exit from such chamber. The upper wall of the heating chamber is extended so as to cover these passages and the slot 18 is continued as two extensions or branches through such upper wall of the passages, such extensions or branches being located at the centers of the passages, respectively. (See Fig. 3). From the entrance passage 19 there extends a lateral passage 21 that communicates with the lower portion of a stack 22 that carries off the products of combustion from the heating chamber. 23 indicates a track supported at intervals by brackets 24 from a fixed portion of the framework of the building. This track overlies the slot 18 at a considerable distance above such slot, and, of course, is curved to correspond to the curvature of that portion of the slot in the upper wall of the heating chamber. Such track extends out over both of the passages 19—20 and may be continued to such points in the building as required.

Arranged at a distance above the track and overlying it is an endless conveyer chain 25 which in the construction shown passes around a large sprocket wheel 26 secured to a vertical shaft 27 that rises from the top of the heating chamber and is suitably journaled in bearings supported from said top wall and from a member of the framework of the building, as best shown in Fig. 2. This sprocket wheel 26 is of such diameter as to hold the chain 25 above and in line with the circular portion of the slot 18 in the top wall of the chamber. This endless chain 25 is held in proper engagement with the large sprocket wheel 26 by means of two smaller sprocket wheels 28 and 29 (see Fig. 1) around which it passes, which latter sprocket wheels direct it properly over the extensions of the slot in the upper walls of the passages 19—20. Such endless chain is further engaged and its direction controlled by other sprocket wheels 30 located as may be required. Such chain is driven through the medium of a motor, indicated by 31, and in the construction shown the power from the motor is applied by an endless belt 32 through a variable speed mechanism, indicated by 33, to a shaft on which a worm 34 is secured, the worm shaft being driven by means of an endless belt 35 running over pulleys on the shaft of the worm 34 and a shaft of the variable speed mechanism 33, respectively. The worm 34 is in mesh with and drives a worm gear 36 that is fast on the shaft to which a sprocket wheel is also made fast, and around which latter sprocket wheel the chain passes. The proper tension is kept on the chain by means of any suitable tension device, such, for example, as that indicated by 37, such tension device comprising, of course, a sprocket wheel for the chain to engage.

38 indicates a series of trolleys mounted to run on the track 23 and each having dependent from the frame thereof a suitable device for holding suspended a hog carcass. As shown, such suspending device is in the form of a long hook 39 which is adapted to be hooked under the jaw of a hog, but it is obvious, of course, that in lieu of such hooks shackles might be substituted adapted to engage the legs of hogs—the only essential being that the depending engaging member, whether a hook or a shackle, shall be of a size to freely pass through the slot 18. At intervals the endless chain 25 has secured to it downwardly extending dogs 40 that project far enough below the chain to engage the frames of the trolleys 38, and when such dogs are in engagement with the trolley frames, as shown in Fig. 2, such trolley frames and the loads suspended therefrom will necessarily be pushed along with the movement of the chain.

It is necessary in order to avoid the loss of heat from the chamber that the admission and discharge of carcasses therefrom be accomplished as expeditiously as possible and with no more opening of the closures for the passages leading to the chamber than is necessary, and I secure such action by means automatically set in operation by the approach of a loaded trolley to the doors that guard such passages. Referring now to such means,—41—41 indicate a pair of inwardly opening doors which when closed stand inclined toward the heating chamber and with their inner edges in contact, such inner edges being beveled, as shown, to provide a tight joint between them. Each of these doors 41 is secured near its outer edge to a long shaft 42 that passes through the floor and foundation of the passage 19 and has its end rotatably mounted in a block 43. These shafts also project through the upper wall of the said passage and are journaled in bearings, as 44, that are secured to a member of the building framework. To each of these vertical shafts is secured so as to turn with it a collar 45 and from each collar, and preferably integral therewith, projects an arm 47, the said arms, when the doors 41 are in closed position, extending across the slot 18 for some little distance, the end portion of one such arm lying above the end portion of the other arm, and both such arms extending in a diagonal position, as indicated by dotted lines in Fig. 1, in the reverse direction to the inclination of the closed doors 41. The collars 45 that carry the arms are located in such position on their respective shafts 42 that the suspension members 39 carried by the trolleys will, as they move through the slot 18, come in contact with such arms and force them forward, such forcing forward, of course, causing a turning of the shafts 42 in their bearings and necessarily turning the doors 41 that are attached to such shafts into opened position to permit the passage of a carcass carried by the suspending device that has just effected such movement of the doors. Also connected with each collar 45 and preferably integral therewith is a segmental rack 48. These two segmental racks project in a forwardly direction from their shafts 42—that is, toward the heating chamber. Each of such segmental racks 48 is in mesh with one of another pair of similar racks indicated by 49, such last-named pair of racks being respectively provided with a collar 50 mounted upon a shaft 51. Such shafts 51 are, as best shown in Fig. 6, mounted at their lower ends in bearings 52 secured to the upper wall of the passage 19 and at its upper end each is journaled in a bearing 53 secured to a member of the building framework. From each of the collars 50 projects an arm 54, said arms being arranged with relation to each other and the slot 18 as are the arms 47 except that they extend in just the reverse diagonal direction from such arms 45 when the doors 41 are in closed position. By reason of this construction it will be evident that the turning of the segments 48 as the doors are opened will also cause a turning of the segments 49 in such manner that their arms 50 will be swung backward, and thereafter as such arms 54 are struck by the suspension device 39 they will be turned in a forward direction which, of course, through the meshing of their connected segments 39 with the other segments 48 will cause a turning of the shafts 42 to swing the doors 41 into closing position. Thus the doors are closed in the very shortest time possible after the movement of a carcass past them, and hence the loss of heat from the chamber is reduced to a minimum. The carcass-suspending members, it will be noted, are pivotally connected to their respective trolley-frames and hence would yield to such an extent as not to cause a movement of the door-operating arms if they were not held against such yielding by the weight of the carcasses attached to them. When, however, carcasses are suspended from them the weight thereof will hold the suspension hooks and the trolley-frames in sufficiently rigid position to insure proper pressure against the arms for causing a movement of the doors.

After the carcass entering the passage 19 passes into the heating chamber it is subjected to the intense heat therein as it is moved therethrough and the time during which it is so subjected to the heat can be regulated, of course, as desired by regulating the speed of the endless chain. The singed carcass will leave the chamber by the passage 20 which is normally closed by a pair of doors 55 that are similar in all respects to the doors 41 except that they are arranged to open outward, as clearly indicated in Figs. 3 and 4. Each door 55 is mounted on shafts 56 corresponding in arrangement to the shafts 42 that carry the other doors, and the segmental racks connected to such shafts 56 and that correspond to the segmental racks 48 are indicated by 57. The segmental racks that they mesh with are indicated by 58 and the shafts that the racks 58 are mounted upon are indicated by 59. The arms connected with the segmental racks 57 are indicated by 60 and the arms connected with the racks 58 are indicated by 61. From the description given as to the manner of opening and closing the doors 41 as a carcass enters the passage 19 it will be obvious how the doors 55 are opened and closed by the same arrangement of devices that they are provided with. At such point or points as may be desired switch tracks will be provided, as usual, to permit the carcasses to be moved onto or off of the trolley track 23, but as such means are common and form no part of our present invention we have not deemed it necessary to illustrate or describe the same.

By the use of a heating chamber of the character described and the mechanism that is used in connection therewith constructed and arranged as stated the endless chain device used for forcing the carcasses through the chamber is so far removed from the intense heat of the chamber that it is not injuriously affected by the heat, and inasmuch as it does not require to pass through a cooling medium as in the case of constructions wherein the chain has to pass directly into the chamber the injurious effects incident to such alternate heating and cooling are avoided and the life of the chain very much increased. Furthermore, by the use of the means described for automatically opening and closing the doors that guard the entrance and exit passages such doors are allowed to be open for the minimum amount of time, thereby avoiding to a very large extent wasting the heat of the chamber; and fuel is conserved to a large extent by so arranging the stack that carries off the products of combustion that such products must, in order to reach the stack, traverse a portion of the passage by which the carcasses are conducted to the heating chamber. The conservation of fuel in this respect is due to the fact that the carcasses which enter the passage in a very wet condition are to a very large extent dried by the hot gases passing to the stack, and hence by the time that they arrive in the chamber proper they are in condition to immediately be acted upon for the singeing process instead of having to pass for a considerable distance in the chamber before being sufficiently dried.

What we claim as our invention and desire to secure by Letters Patent, is—

1. The combination with a closed chamber having an entrance and an exit opening in its side wall and having in its upper wall a continuous slot extending from one of such openings to the other, of doors for such openings, means connected with said doors and extending across said slot, and movable means adapted to move said last-named means for opening said doors, said movable means comprising a member that travels above said upper wall and a carcass-suspending device depending from said member through the slot.

2. The combination with a closed chamber having an entrance and an exit opening in its side wall and having in its upper wall a continuous slot extending from one of such openings to the other, of doors for such openings, rotatably-mounted vertical shafts connected with said doors respectively and projecting above said upper wall, an arm secured to such projecting portion of each shaft and extending laterally therefrom across said slot, and movable means adapted by contact with said arms to turn said shafts and the doors connected therewith, said movable means comprising a member that travels above said upper wall and a carcass-suspending device depending from said member through the slot.

3. The combination with a closed chamber having a doorway in its side and a slot in its upper wall that extends out of the chamber over the doorway, of a door for closing the doorway, a rotatable vertical shaft fixedly secured to said door and projecting above said upper wall, an arm secured to such projecting portion of the shaft and extending laterally therefrom across said slot, a second laterally-extending arm pivotally mounted at a distance from said first-named arm and also extending across said slot, means for connecting said two arms together to cause them to turn simultaneously but in opposite directions, and movable means adapted to contact with said arms successively to cause an opening and then a closing of said door, said movable means comprising a member that travels above said upper wall and a carcass-suspending device depending from said member through the slot.

4. The combination with a closed chamber having a doorway in its side and a slot in its upper wall that extends out of the chamber over the doorway, of a door for closing the doorway, a rotatable vertical shaft fixedly secured to said door and projecting above said upper wall, an arm secured to such projecting portion of the shaft and extending laterally therefrom across said slot, a second laterally-extending arm pivotally mounted at a distance from said first-named arm and also extending across said slot, intermeshing toothed segments connected with said arms respectively to cause such arms to turn simultaneously but in opposite-directions, and movable means adapted to contact with said arms successively to cause an opening and then a closing of said door, said movable means comprising a member that travels above said upper wall and a carcass-suspending device depending from said member through the slot.

5. The combination with a closed chamber having a doorway in its side and a slot in its upper wall that extends out of the chamber over the doorway, of a door for closing the doorway, a rotatable vertical shaft fixedly secured to said door and projecting above said upper wall, an arm secured to such projecting portion of the shaft and extending laterally therefrom across said slot, a second laterally-extending arm pivotally mounted at a distance from said first-named arm and also extending across said slot, means for connecting said two arms together to cause them to turn simultaneously but in opposite directions, a track above said slot, a trolley movable on said track, a movable endless chain adjacent to said track, and a projecting member carried by said chain for engaging said trolley and moving it on said track to cause it to successively engage and move said arms for opening and closing the door, said trolley comprising a wheeled member that travels on said track and a carcass-suspending device that depends from said member through the slot.

6. In an apparatus of the class described, the combination of a heating chamber, a passage leading thereto, a stack for conducting products of combustion from the heating chamber, a second passage leading from a point intermediate the ends of the first-named passage to the stack, and means for moving carcasses along said first-named passage and past the second-named passage against the products of combustion passing to the second-named passage.

7. In an apparatus of the class described, the combination of a heating chamber, a passage leading thereto, a door normally closing the outer end of said passage, a stack communicating with said passage, suspending means comprising an overhead trolley for holding and moving carcasses along said passage against the products of combustion passing therethrough to the stack, and means connected with the door and lying in the path of the suspending means for automatically opening and closing said door when contacted by said suspending means.

HAROLD D. BLISS.
WILLIAM H. NEUBECK.

Copies of this patent may be obtained for five cents each, by addressing the "Commissioner of Patents, Washington, D. C."